(12) United States Patent
Derakhshani et al.

(10) Patent No.: US 11,645,374 B2
(45) Date of Patent: *May 9, 2023

(54) CAPACITIVE THROUGH-BODY COMMUNICATION

(71) Applicant: Jumio Corporation, Palo Alto, CA (US)

(72) Inventors: Reza R. Derakhshani, Shawnee, KS (US); Blake Willig, Blue Springs, MO (US)

(73) Assignee: Jumio Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,029

(22) Filed: Sep. 27, 2021

(65) Prior Publication Data
US 2022/0012322 A1 Jan. 13, 2022

Related U.S. Application Data

(63) Continuation of application No. 16/250,873, filed on Jan. 17, 2019, now Pat. No. 11,132,428.

(51) Int. Cl.
*G06F 21/32* (2013.01)
*G06F 3/0354* (2013.01)
*G06F 1/16* (2006.01)
*G06Q 20/40* (2012.01)
*G06F 3/01* (2006.01)
*G06Q 20/18* (2012.01)
*G07C 9/26* (2020.01)

(52) U.S. Cl.
CPC .............. *G06F 21/32* (2013.01); *G06F 1/163* (2013.01); *G06F 3/011* (2013.01); *G06F 3/03547* (2013.01); *G06Q 20/18* (2013.01); *G06Q 20/40145* (2013.01); *G07C 9/26* (2020.01)

(58) Field of Classification Search
None
See application file for complete search history.

(56) References Cited

U.S. PATENT DOCUMENTS

| 10,248,779 | B2 | 4/2019 | Song et al. |
| 11,132,428 | B2 * | 9/2021 | Derakhshani .......... G06Q 20/18 |
| 2014/0196131 | A1 | 7/2014 | Lee |
| 2015/0035643 | A1 | 2/2015 | Kursun |

OTHER PUBLICATIONS

Kang et al., "Review of Capacitive Coupling Human Body Communications Based on Digital Transmission," ICT Express, Dec. 2016, 2(4):180-187.

* cited by examiner

*Primary Examiner* — Kristy A Haupt
(74) *Attorney, Agent, or Firm* — Patent Law Works LLP

(57) ABSTRACT

Methods, systems, and apparatus, including computer programs encoded on a computer storage medium, for capacitive through-body communication. In one aspect, a method includes capturing, from capacitive through-body communication with an on-body device worn by an individual, a biometric template comprising identification data associated with the individual, comparing the captured identification data of the captured biometric template with reference identification data of a stored biometric template associated with the individual, determining that the captured identification data matches the reference identification data of the stored biometric template; and authenticating identification of the individual.

20 Claims, 5 Drawing Sheets

CAPACITIVE THROUGH-BODY COMMUNICATION

CROSS-REFERENCE TO RELATED APPLICATIONS

This application is a continuation of and claims the benefit of priority of U.S. patent application Ser. No. 16/250,873, filed on Jan. 17, 2019, which is hereby incorporated by reference in its entirety.

TECHNICAL FIELD

This specification generally relates to methods in identification technology.

BACKGROUND

Systems incorporating body coupled communication (BCC) technology uniquely identify users by transmitting and receiving communication signals to/from external objects. Communication signals provided between users and external objects include coded data streams to communicate identity data.

SUMMARY

Implementations of the present disclosure are generally directed to verifying user identity through capacitive communication. More specifically, implementations are directed to communicating data flows through touch credentials of trusted on-body devices as an initial (or secondary) factor, or as a token of identity. Increased data flow communications to establish user identity with an external object improves interaction speed and reduces interaction time between the user and the external object.

Implementations of the present disclosure include reverse flow of information. For example, a kiosk may transmit its identification (ID) and, for an on-body device, to listen for the identification. If the user makes contact with (touches) a particular kiosk, the user's device will receive the kiosk's ID (via capacitive coupling) and then transmit the kiosk's ID to a service provider's servers. The transmitted information may include identification of which registered on-body device made contact with the particular kiosk to resolve user or device identity, location, time stamp, and identification of the particular kiosk interacting with the registered on-body device. Accordingly, the user is not broadcasting their identity, which improves protection of the user's privacy, and the mode of operation of their device (receive only) will improve the battery life of the user's device, thereby making the data flows more battery-friendly.

In a general implementation, systems, apparatus, and methods for verifying user identity include capturing, by an identification processing device from capacitive through-body communication with an on-body device worn by an individual, a biometric template comprising identification data associated with the individual; comparing, by the identification processing device, the identification data of the captured biometric template with reference identification data of a stored biometric template associated with the individual; determining, by the identification processing device based upon the comparing, that the captured identification data matches the reference identification data of the stored biometric template; and authenticating, by the identification processing device based upon the determining, identification of the individual.

In yet another general implementation, a system includes an identification processing device, a one or more processors, and a computer-readable storage device coupled to the one or more processors and having instructions stored thereon which, when executed by the one or more processors, cause the one or more processors to perform operations that include capturing, by an identification processing device from capacitive through-body communication with an on-body device worn by an individual, a biometric template comprising identification data associated with the individual; comparing, by the identification processing device, the identification data of the captured biometric template with reference identification data of a stored biometric template associated with the individual; determining, by the identification processing device based upon the comparing, that the captured identification data matches the reference identification data of the stored biometric template; and authenticating, by the identification processing device based upon the determining, identification of the individual.

In another general implementation, one or more non-transitory computer-readable storage media coupled to one or more processors and having instructions stored thereon which, when executed by the one or more processors, cause the one or more processors to perform operations that include: capturing, from capacitive through-body communication with an on-body device worn by an individual, a biometric template comprising identification data associated with the individual; comparing the identification data of the captured biometric template with reference identification data of a stored biometric template associated with the individual; determining that the captured identification data matches the reference identification data of the stored biometric template; and authenticating identification of the individual.

An aspect combinable with the general implementations, the operations or method includes establishing communication between the identification processing device and the individual.

In an aspect combinable with any of the previous aspects, the operations or method includes transmitting, from the identification processing device to the on-body device, identification data associated with the identification processing device; transmitting, from the on-body device to the identification processing device, identification data associated with the on-body device; and transmitting, from the identification processing device to a service provider server, the identification data associated with the on-body device.

In an aspect combinable with any of the previous aspects, the operations or method includes transmitting, by the identification processing device during the establishing communication, an identification sequence to the on-body device to transition the on-body device into an awake mode.

In an aspect combinable with any of the previous aspects, the identification data comprises a hash of the identification data associated with the individual.

In an aspect combinable with any of the previous aspects, the identification data comprises at least one of the individual's login information, telephone number(s), account number(s), date of birth, identification/registration number(s) of the electronic device, associated contact information, passwords, access numbers, and fingerprint data. Additionally, less sensitive identification data may be used. For example, encrypted identification data may include a hash of the identification data or a key exchange protocol may be used. In some implementations, a biometric template(s)

could be use. For example, the biometric template(s) may comprise the identification data, as well as other aspects of the individual's identity.

In an aspect combinable with any of the previous aspects, the capacitive through-body communication includes transmission of digital signals through a human body. In an aspect combinable with any of the previous aspects, the identification processing device includes a capacitive plate provided beneath a location where the user is positioned during the capturing of the biometric template.

Particular implementations of the subject matter described in this disclosure can be implemented so as to realize one or more of the following advantages. The capacitive through-body communication allows communicating via touch credentials of a trusted on-body device as an initial or secondary factor (token) of identity. By making use of the human body's ability to transmit communication data, privacy conscious solutions can be implemented in relatively high throughput scenarios in order to quickly and efficiently authenticate and verify an individual's identity.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
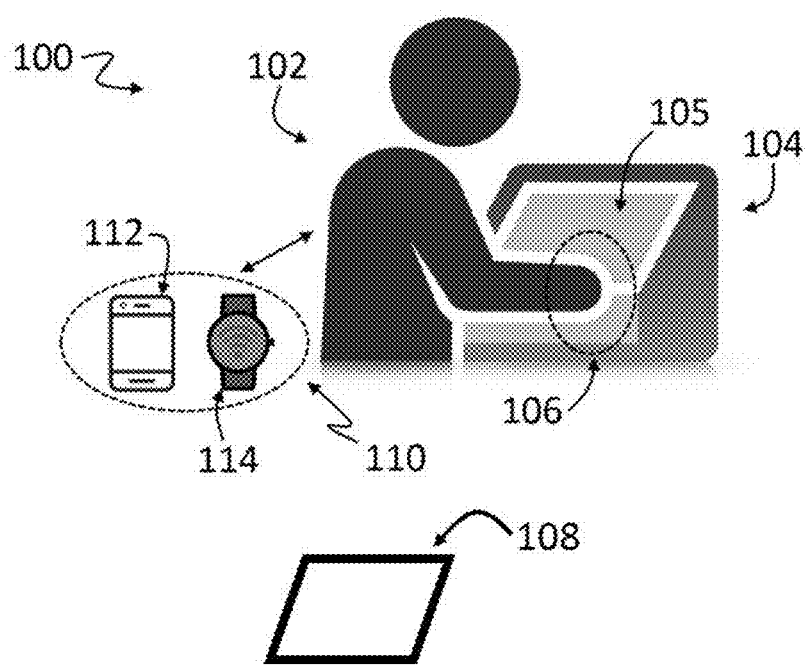
FIG. 1 depicts a kiosk machine as an example environment in which a capacitive communication system may deployed.

Implementations of the present disclosure are generally directed to establishing and conducting communication between a user and an external object. More particularly, implementations of the present disclosure are directed to a capacitive communication system deployed within a kiosk type device that employs establishing communication with users to capture, authenticate, and verify identification of the users. Services are provided, through the kiosk, to the users based on the verification.

In some implementations, the external communicating device may include additional/different devices. For example, the external communicating device can include a smart price tag; a rental transportation device, such as a rental car, bike, or scooter; a door knob; a turnstile; a liquid crystal display (LCD) screen; and an input device, such as a mouse, touchpad, keyboard, or stylus. In some implementations, a capacitive plate could be embedded in the ground. For example, the capacitive plate could be provided beneath a tile or floor mat and the user's feet could couple with the capacitive plate as they walk upon the capacitive plate. In some implementations, a communicating surface could be embedded in an object utilized by the user. For example, the communicating surface could be part of a seat upon which the user may sit.

Various identification/authentication systems are based on capturing identity information data that can be compared with or analyzed with reference to known identity identification data to authenticate and verify an identity of a user of the system. Identity information data refers to any computer data that is presented by a user, associated with the user, and used by a computer for purposed of verifying an identity, or aspect of identity, of the user.

Authentication systems may employ models, templates, images, maps, similarity scores and so forth that are generated based on identity information data captured from an individual and compared with identity information data having been previously known, collected or provided, such as telephone number(s), account number(s), date of birth, device identification/registration number(s), associated contact information, passwords, access numbers, and fingerprint data. All or a subset of the above identity information data maybe fused to provide more comprehensive authentic identification from the aforesaid identity information data to be used by itself or to help with identity verification.

In view of the foregoing, and as described in further detail herein, implementations of the present disclosure provide for an identity authentication system that can be deployed within a kiosk-type device, such as an automated teller machine (ATM), public transportation system (bus or subway), private transportation system (autonomous vehicle or matched driver service), and personal transportation rental machine, such as a bicycle rental machine and a scooter rental machine, and deployed within/upon the vehicle itself. In some implementations, the described identity authentication system employs intra-body communication in which the human body is used as a signal transmission waveguide in a personal area network (PAN) to transmit identity information data. By implementing a designated surface at the kiosk-type device with an electromagnetically conductive surface to transmit and receive communications between the kiosk-type device and a user of the kiosk-type device, identity information data can be transmitted and received using capacitive through-body communication to authenticate and verify the identity of a user of the kiosk-type device.

This capacitive through-body communication allows for interaction between the kiosk-type device and one or more personal electric devices possessed (or worn) by a user of the kiosk-type device. By allowing communication between the kiosk-type device and the one or more personal electric devices possessed by the user, identity of the user may be quickly authenticated and verified by the kiosk-type device, as compared to the user having to manual entry their identification data, such as login information, account information, and password(s). In some authentication systems, verifying an individual's identity can take a relative long amount of time compared to the size of the authentication system and the number of individuals' identities requiring verification. The larger the authentication system, the more verifications and authentications of individuals' identities, and the longer the time to authenticate and verify a single individual's identity. In some situations, such as a financial institution, especially a world-wide banking institution, there may exist over a billion customer accounts, each requiring authentication and verification on almost a regular (if not more frequent) basis. In other situations, such as public transportation in which almost one million people require a financial transaction, either adding fare for travel or paying directly at a turnstile during a narrow time period (morning rush or evening rush), it is necessary to perform identity authentication and verification of an individual in a near instantaneous time period. Accordingly, a more instantaneous system and method must be implemented by which identity authentication and verification does not require, in each instance, communicating with a server geographically located in a different area from where the identity authentication and verification needs to occur. Implementing a system that makes use of capacitive through-body communication between a user of a kiosk-type device and one or more personal electric devices possessed (or worn) by a user of the kiosk-type device allows for almost instantaneous authentication and verification of the user's identity with which to conduct a transaction at the kiosk-type device without having to access an off-site server for identity authentication and verification.

FIG. 1 depicts a kiosk machine 104 as an example environment 100 to which an identity authentication system may deployed. The kiosk machine 104 includes one or more components that support identity authentication. In some implementations, the kiosk machine 104 includes a display component 105 configured to display information and an electromagnetically conductive surface 106 configured to support capacitive through-body communication by a user 102. For example, the kiosk machine 102 can include an electromagnetically conductive surface 106 to receive communication between a user 102 and the kiosk machine 104. In some implementations, capacitive coupling may provide for the communication. For example, unlike galvanic conduction, capacitive coupling works without direct conductive touch, in which electric fields from one capacitive plate permeate air, clothing, etc. when proximal to the other terminating plate. Accordingly, a communication loop for the communication between the user 102 and the kiosk machine 104 may not necessarily need to be closed through conductivity. In some implementations, the communication between the user 102 and the kiosk machine 104 may not necessarily require direct physical contact. For example, similar to the action of a capacitor, contact between the user 102 and the kiosk machine 104 may be accomplished based upon close proximity communication (gaps) between the user 102 and the kiosk machine 104 without direct physical contact.

In some implementations, the electromagnetically conductive surface 106 may include a touchpad in which the user 102 may place a finger, fingers, palm, or entire hand. For example, the electromagnetically conductive surface 106 may be provided as a dedicated area large enough to accommodate and comfortably place a finger, fingers, palm, or entire hand of the user 102. In some implementations, the electromagnetically conductive surface 106 may include a handle for grasping by the user 102. For example, a joystick-style handle may be provided or a bicycle handlebar-style grip may be provided. In some implementations, the electromagnetically conductive surface 106 may be incorporated within the display component 105. For example, a side, top, bottom, or central region of the display component 105 may have embedded therein the electromagnetically conductive surface 106. In these instances, contact between the finger, fingers, palm, or entire hand of the user 102 and the electromagnetically conductive surface 106 should be maintained in order to ensure communication during interaction of the user 102 with the kiosk machine 104. For example, contact of the user 102 with the electromagnetically conductive surface 106 should be maintained at least long enough for identity authentication to be performed.

In some implementations, an electromagnetic conductive surface 108 may be provided, in which the user stands upon a mat or platform that includes the electromagnetic conductive surface 108. For example, while the user 102 is standing before the kiosk machine 104, communications can be initialed and conducted with the kiosk machine 104 without direct physical contact with surface(s) of the kiosk machine 104. In particular, no skin-to-surface contact is required in order to initiate and conduct communications with the kiosk machine 104. In some implementations, the electromagnetic conductive surface 108 may be provided, in which the user sits upon a seating area or seating platform that includes the electromagnetic conductive surface 108. For example, while the user 102 is sitting adjacent to the kiosk machine 104, communications can be initialed and conducted with the kiosk machine 104 without direct physical contact with surface(s) of the kiosk machine 104.

Additionally, the display component 105 may display feedback to the user 102 during identity authentication to ensure that proper contact is initiated and/or maintained. In some implementations, a user interface may be provided by the display component 105 to provide the user with feedback before, during, or after identity authentication. For example, the user interface may visually indicate to the user 102 that contact with the electromagnetically conductive surface 106 is required, that the contact position with the electromagnetically conductive surface 106 needs to be adjusted, or that no contact is being detected by the electromagnetically conductive surface 106. In another example, audible feedback may be provided to the user 102 during identity authentication indicating that identity authentication is required, is being performed, or has concluded.

During capacitive through-body communication by the user 102 with the kiosk machine 104, communication is established between the kiosk machine 104 and an on-body device 110 using the electromagnetically conductive surface 106. In some implementations, the on-body device 110 may include a smart phone 112 and/or a smart watch 114. For example, the user 102 may possess a smart phone 112 located in a shirt pocket, pants/dress pocket, or the smart phone 112 may be held in the hand of the user 102. In another example, the smart watch 114 may be located on a wrist region of the user 102. In these instances, the on-body device 110 is provide close to or contacting a surface of the user 102. In some implementations, both the smart phone 112 and the smart watch 114 may be located on the user 102.

Figure 2:
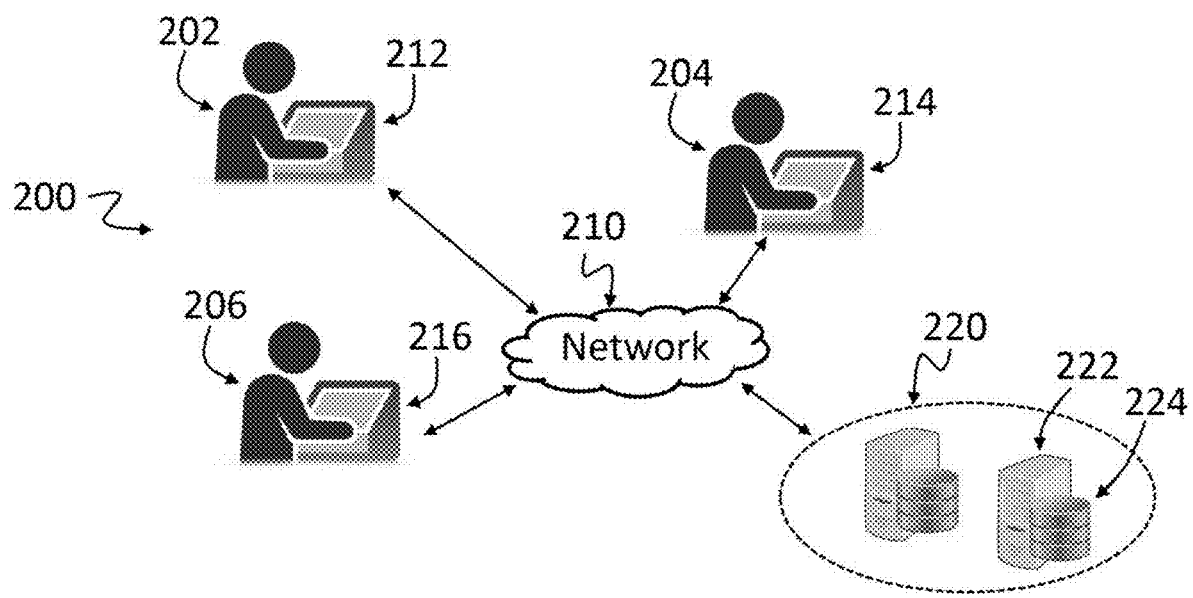
FIG. 2 depicts an example environment that can be employed to multi instances of a capacitive communication system.

FIG. 2 depicts an example environment 200 that can be employed to execute and/or coordinate multi instances of the described identity authentication system. The example environment 200 includes network 210, a back-end system 220, and kiosk devices 212, 214, and 216. The kiosk devices 212, 214, and 216 are substantially similar to the kiosk device 104 of FIG. 1.

In some implementations, the network 210 includes a local area network (LAN), wide area network (WAN), the Internet, or a combination thereof, and connects computing devices (e.g., the kiosk devices 212, 214, and 216) and back-end systems (e.g., the back-end system 220). In some implementations, the network 210 can be accessed over a wired and/or a wireless communications link.

In the depicted example, the back-end system 220 includes at least one server system 222 and a data store 224. In some implementations, the back-end system 220 provides access to one or more computer-implemented services with which the kiosks 212, 214, and 216 may interact. The computer-implemented services may be hosted on, for example, the at least one server system 222 and the data store 214. The computer-implemented services may include, for example, an authentication service that may be used by the kiosks 212, 214, and 216 to authenticate identity of a user based on collected identity information data.

In some implementations, the back-end system 220 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 220 is deployed and provides computer-implemented services through a virtual machine(s).

Figure 3:
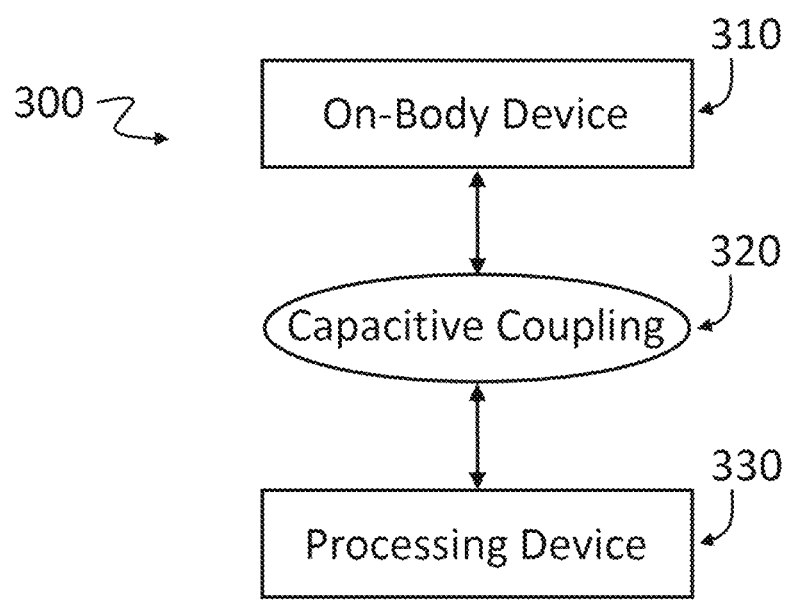
FIG. 3 depicts a system that can be used to implement the technology described herein.

FIG. 3 depicts a system 300 that can be used to implement the technology described herein. The system 300 includes an on-body device 310 and a processing device 330, with capacitive coupling 320 provided therebetween. In some implementations, the system 300 may be included within a kiosk, such as the kiosk machine 100 described with reference to FIG. 1. For example, the on-body device 310 may include the smart phone 112 and/or the smart watch 114 described with reference to FIG. 1.

In some implementations, communications are initially along a direction from the processing device 330 to the on-body device 310 via the capacitive coupling 320. For example, when a user, such as the user 102 described with reference to FIG. 1, initiates communication (direct or indirect contact) with the processing device 330 using an interface, such as the electromagnetically conductive surface 106 described in FIG. 1, an identification sequence may be transmitted from the processing device 330 to the on-body device 310. As a result, the on-body device 310 may receive the identification sequence as a preamble message.

In some implementations, the identification sequence transmitted by the processing device 330 may include a signal directed toward determining if the user possesses on their person a device that can communicate with the processing device 330. For example, the identification sequence can include a wake-up signal meant to be detected by the on-body device 310. If the on-body device 310 successfully receives the identification sequence, and transitions from a sleep state to an awake state, then the on-body device 310 can transmit back to the processing device 330 that the user indeed possesses a device that can communicate with the processing device 330, and establish communication with the processing device 330. However, if no transmission is received by the processing device 330 that the user possesses a device that can communicate with the processing device 330, then the processing device 330 may request that the user manually enter identification data to authenticate and verify user identity. For example, the user interface provided by the display component 105 may include an indication that no on-body device 310 is detected and that manual entry of user identification data is required in order to authenticate and verify the user's identity.

In some implementations, communications proceed along a two-way direction, in which the on-body device 310 and the processing device 330 communicate in both receiving and transmission modes. For example, once the processing device 330 determines that the user possesses the on-body device 310, the processing device 330 may transmit, through the capacitive coupling 320 (via direct or indirect contact), a request to the on-body device 310 to transmit identification data stored on the on-body device 310. In some implementations, the identification data stored on the on-body device 310 may be pre-designated by the user for purposes of authenticating and validating identity. For example, the identification data can include information associated with a particular user's login information, telephone number(s), account number(s), date of birth, device identification/registration number(s), associated contact information, passwords, access numbers, and fingerprint data. By having the identification data previously known and accessible by the processing device 330, a comparison can be made between the identification data transmitted from the on-body device 310 to the processing device 330 with the previously stored identification data. As a result of the comparison, the user's identity can be authenticated and validated.

In some implementations, the identification data stored by the on-body device 310 may include identification data saved by the user for a particular software application for purposes of authenticating and validating identity. For example, the on-body device 310 may include a software application that is associated with the processing device 330 of a particular kiosk machine. When the processing device 330 transmits an identification sequence to detect the on-body device 310, via the capacitive coupling 320, the transmission may also include specific instructions for the software application to transmit to the processing device 330 the identification data for authenticating and validating identity. In this manner, the processing device 330 may compare the identification data provided by the software application with identification data previously known by the processing device 330. As a result of the comparison, the user's identity can be authenticated and verify.

By using the capacitive coupling 320, the user of a kiosk machine may establish communication by transmit identification data to the processing device 330 by making physical contact with a particular portion of the kiosk machine, or by positioning a portion of the user's body with respect to a particular portion of the kiosk machine. In this manner, the user of the kiosk machine consents, by establishing the communication with the particular portion of the kiosk machine, to having the processing device 330 of the kiosk machine determine whether information data is available for use to authenticate and verify the user's identity. In some implementations, the user may have an option to selectively allow/deny the processing device 330 to receive the information data. For example, although the act of making physical contact with a kiosk machine may allow for the processing device 330 to transmit the identification sequence to the on-body device 310, the user may be presented with an option, via the on-body device 310, software application running on the on-body device 310, or remotely from a website associated with the on-body device 310 and/or software application, to not allow the information data to be transmitted by the on-body device 310 to the processing device 330. Accordingly, the use maintains control over circumstances in which information data is transmitted.

Figure 4:
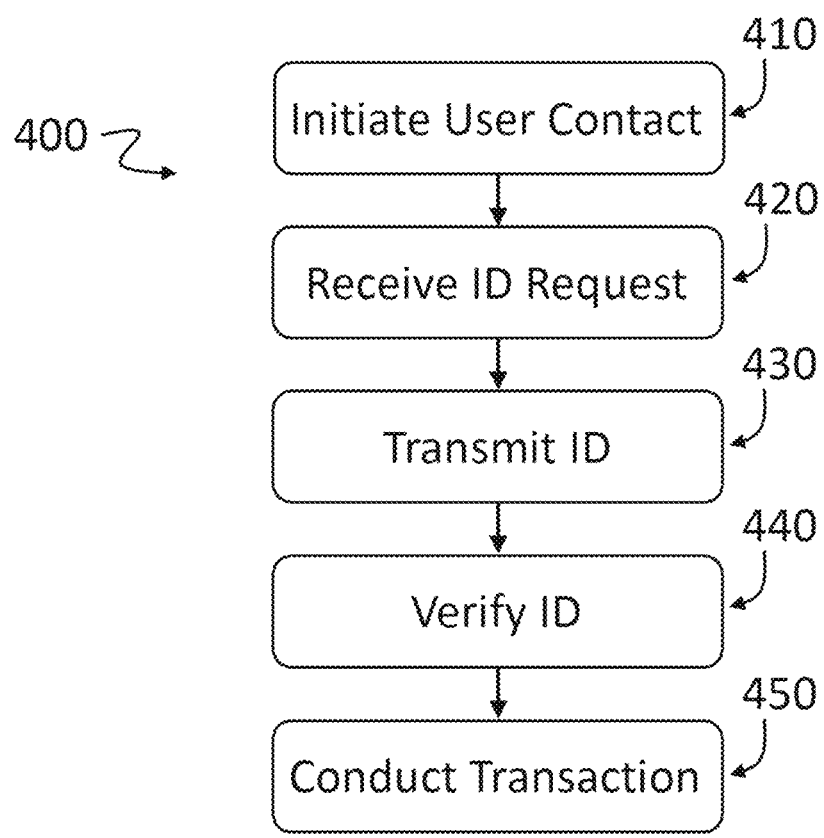
FIG. 4 is a flowchart of an example process employed within a capacitive communication system.

FIG. 4 is a flowchart of an example process employed within a capacitive communication system. In FIG. 4, an identification authentication and verification process begins at step 410, when a user initiates contact with a kiosk machine. As discussed above with respect to FIG. 3, a user may make direct or indirect physical contact with a kiosk machine and establishes capacitive coupling 320 between an on-body device 310 and a processing device 320. In some implementations, in order to preserve battery and improve security, step 410 can include a wake-up method so that only after touching or starting to interact with the kiosk machine (and optionally after receiving a predetermined handshake signal) full communication between the user and the kiosk machine could proceed. For example, a proximity sensor, such as a capacitive sensor, an optical sensor, or a pressure sensitive sensor, in the kiosk machine could be used to wake-up the kiosk machine. Then, a receiver of the kiosk machine may optionally listen for certain handshake sequences, such as certain pilot frequencies, before actual data communication occurs between the user and the kiosk machine. In some implementations, the kiosk proximity sensor wakes up its transmitter. In general, a kiosk is transmitting and a user device (on-body device 310) is listening (receiver). For example, the receiver is the user's on-body device 310. The on-body device 310, as it listens, is first in its default low power, and always in a listening mode. In the listening mode, the on-body device 310 is looking for certain (simple) preamble signals transmitted through the capacitive touch channel. Once a modem of the on-body device 310 correctly detects the preamble signals, the on-body device 310 transitions into a higher-powered receiving mode capable of decoding the ensuing more complex code transmitted by the kiosk (the base station).

At step 420, the on-body device 310 receives an identification request from the kiosk machine via the capacitive coupling 320 between the user and the processing device 330 of the kiosk machine. In some implementations, a preamble is received by the on-body device 310, and an identification request is made to the on-body device 310 to transmit a biometric template comprising identification data associated with the user. For example, the preamble may include a request for response from the on-body device 310 in order to determine that the user possesses the on-body device 310 and that on-body device 310 is an electronic device capable of communicating with the processing device 330.

At step 430, in response to confirming that the on-body device 310 is capable of communicating with the processing device 330, the on-body device 310 transmits the biometric template that includes the identification data associated with the user to the processing device 330 via the capacitive coupling between the on-body device 310 and the processing device 330. In some implementations, the identification data may comprise encoded binary data. For example, the data may be encoded via frequency-shift keying (FSK), multiple frequency-shift keying (mFSK), or amplitude-shift keying (ASK). In some implementations, other resilient modulation schemes used by modem systems may be deployed. For example, FSK with frequencies ranging from approximately 90 kHz to 160 kHz may be used. In some implementations, error detecting and correcting codes may be used.

At step 440, the processing device 330 processes the identification data received from the on-body device 310 and verifies identification of the user associated with on-body device 310. In some implementations, the processing device 330 verifies identification of the user by comparing the identification data of the user's biometric template scanned in real time for verification or identification with reference identification data of a stored biometric template associated with the user. For example, a comparison is made between the identification data of the previously captured biometric template received from the on-body device 310. Based upon the comparison, the identity of the user of the on-body device 310 can be authenticated and verified. In some implementations, the user may select to prevent the information data to be transmitted. For example, in the event that the user no longer possess the on-body device 310, either by lending the on-body device to another individual, by losing the on-body device 310, or by having the on-body device 310 stolen from the user, the user has an ability to select to not allow the identification data to be transmitted by the on-body device 310.

At step 450, after the user's identity has been authenticated and verified by the processing device 330, the user is authorized to conduct transactions with the kiosk machine. In some implementations, the user is authorized to conduct financial transactions with the kiosk machine. For example, the kiosk machine may be an automatic teller machine (ATM) in which money may be withdrawn or transferred, or payment(s) may be scheduled.

In some implementations, the kiosk machine may be part of a public transportation system. For example, when an individual uses public transportation, payment of an associated fare is usually required. In some instances, payment of the fare may be an electronic transaction, whereby the individual's identity must be established in order to have the fare electronically deducted from an electronic fare card or directly from an associated financial account. Accordingly, the individual may physically contact a kiosk machine (or designated contact region) located on a bus or subway station in order to initiate communication from the on-body device 310 to the processing device 330 of the kiosk machine via the capacitive coupling 320 to render fare payment.

In some implementations, the kiosk machine may be part of a private transportation system. For example, when an individual uses an autonomous vehicle (AV) or a matched driver service, such as Uber, verifiable identification of the individual and payment of an associated fare is sometimes render when the AV or driver arrives at a pick-up location. In some instances, payment of the fare may be an electronic transaction, whereby the individual's identity must be established and verified directly by the AV itself or indirectly via a remote service in order to have the fare electronically deducted from an electronic fare card or directly from an associated financial account. Accordingly, the individual may physically contact a kiosk machine (or designated contact region) located in/on the AV or provided by the driver in order to initiate communication from the on-body device 310 to the processing device 330 of the kiosk machine via the capacitive coupling 320 to verify identity and render fare payment.

In some implementations, the kiosk machine may be part of a personal transportation rental machine. For example, when an individual uses a bicycle rental machine and a scooter rental machine, verifiable identification of the individual is required and payment of an associated rental fee is sometimes rendered prior to the occurrence of the rental. In some instances, verifiable identification of the individual may be accomplished by the individual physically contacting a kiosk machine (or designated contact region) associated with the bicycle rental machine or scooter rental machine. Additionally, verifiable identification of the individual may be accomplished by the individual directly or indirectly contacting the bicycle or scooter, rather than a machine used to dispense the bicycle or scooter. Accordingly, the actual bicycle or scooter may conduct and perform the verifiable identification of the individual without using the machine that dispenses the bicycle or scooter. Accordingly, communication is initiated between an on-body device 310 possessed by the individual and the processing device 330 of the kiosk machine (or of the bicycle or scooter) via the capacitive coupling 320 to verify identification of the individual.

Figure 5:
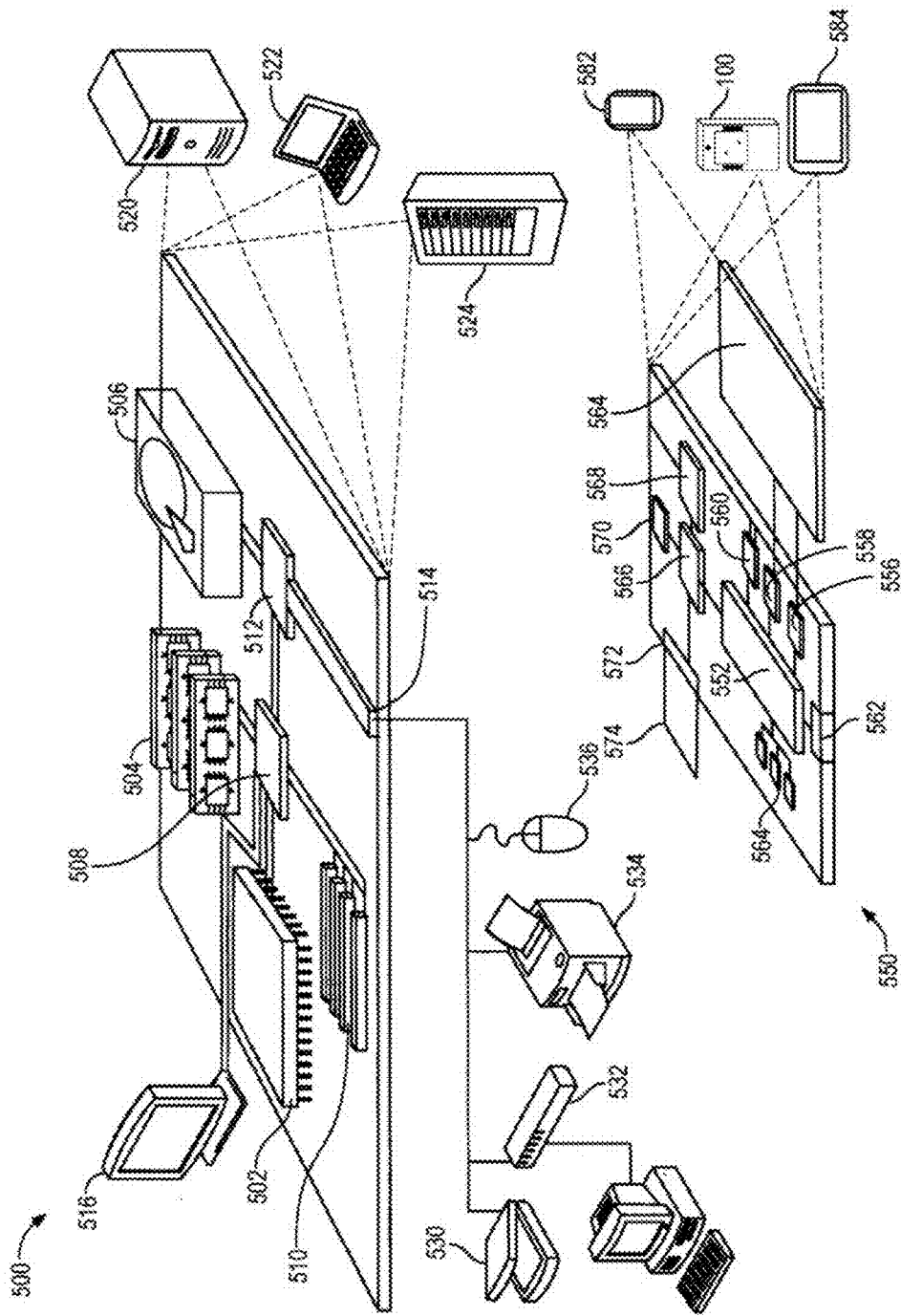
FIG. 5 is a block diagram representing examples of computing devices.

FIG. 5 shows an example of a computing device 500 and a mobile computing device 550 that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented the example environment 100 described in FIG. 1. Other implementations may include a mobile device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for authenticating identification of an individual comprising:
   transmitting, by an identification processing device via capacitive communication that uses a body of an individual as a signal transmission waveguide, an identification sequence to a device associated with the individual;
   receiving, by the identification processing device via the capacitive communication, confirmation that the individual possesses the device associated with the individual;
   establishing, by the identification processing device via the capacitive communication, a communication connection with the device associated with the individual;
   transmitting, by the identification processing device via the capacitive communication, a request to the device associated with the individual to transmit identification data stored on the device associated with the individual;
   comparing, by the identification processing device, the identification data stored on the device associated with the individual with reference identification data associated with the individual;
   determining, by the identification processing device based upon the comparing, that the identification data stored on the device associated with the individual matches the reference identification data; and
   authenticating, by the identification processing device based upon the determining, identification of the individual.

2. The computer-implemented method of claim 1, wherein transmitting an identification sequence to a device associated with the individual comprises:
   transmitting a wake-up signal to the device associated with the individual;
   detecting that the wake-up signal is meant for the device associated with the individual;
   transitioning the device associated with the individual from a sleep state to an awake state; and
   transmitting, to the identification processing device via the capacitive communication, the confirmation that the individual possesses the device associated with the individual.

3. The computer-implemented method of claim 1, wherein the device associated with the individual and the identification processing device communicate via the capacitive communication in both receiving and transmission modes.

4. The computer-implemented method of claim 1, wherein the identification data stored on the device associated with the individual is pre-designated by the individual for authenticating and validating identity of the individual.

5. The computer-implemented method of claim 4, wherein the identification data stored on the device associated with the individual comprises information associated with at least one of login information of the individual, telephone number(s), account number(s), date of birth, device identification/registration number(s) related to the device associated with the individual, associated contact information, passwords, access numbers, and fingerprint data.

6. The computer-implemented method of claim 1, wherein the identification data stored on the device associated with the individual includes identification data saved by the individual for a particular software application for authenticating and validating identity of the individual.

7. The computer-implemented method of claim 6, wherein transmitting an identification sequence to a device associated with the individual comprises:
   transmitting, by the identification processing device via the capacitive communication, instructions for the particular software application to transmit the identification data stored on the device associated with the individual to the identification processing device for the authenticating and validating identity of the individual.

8. A system, comprising:
   an identification processing device;
   one or more processors; and
   a computer-readable storage device coupled to the one or more processors and having instructions stored thereon which, when executed by the one or more processors, cause the one or more processors to perform operations comprising:
      transmitting, by an identification processing device via capacitive communication that uses a body of an individual as a signal transmission waveguide, an identification sequence to a device associated with the individual;
      receiving, by the identification processing device via the capacitive communication, confirmation that the individual possesses the device associated with the individual;
      establishing, by the identification processing device via the capacitive communication, a communication connection with the device associated with the individual;
      transmitting, by the identification processing device via the capacitive communication, a request to the device associated with the individual to transmit identification data stored on the device associated with the individual;
      comparing, by the identification processing device, the identification data stored on the device associated with the individual with reference identification data associated with the individual;
      determining, by the identification processing device based upon the comparing, that the identification data stored on the device associated with the individual matches the reference identification data; and
      authenticating, by the identification processing device based upon the determining, identification of the individual.

9. The system of claim 8, wherein transmitting an identification sequence to a device associated with the individual comprises operations of:
   transmitting a wake-up signal to the device associated with the individual;

detecting that the wake-up signal is meant for the device associated with the individual;

transitioning the device associated with the individual from a sleep state to an awake state; and transmitting, to the identification processing device via the capacitive communication, the confirmation that the individual possesses the device associated with the individual.

10. The system of claim 8, wherein the device associated with the individual and the identification processing device communicate via the capacitive communication in both receiving and transmission modes.

11. The system of claim 10, wherein the identification data stored on the device associated with the individual comprises information associated with at least one of login information of the individual, telephone number(s), account number(s), date of birth, device identification/registration number(s) related to the device associated with the individual, associated contact information, passwords, access numbers, and fingerprint data.

12. The system of claim 8, wherein the identification data stored on the device associated with the individual includes identification data saved by the individual for a particular software application for authenticating and validating identity of the individual.

13. The system of claim 12, wherein transmitting an identification sequence to a device associated with the individual comprises operations of:

transmitting, by the identification processing device via the capacitive communication, instructions for the particular software application to transmit the identification data stored on the device associated with the individual to the identification processing device for the authenticating and validating identity of the individual.

14. One or more non-transitory computer-readable storage media coupled to one or more processors and having instructions stored thereon which, when executed by the one or more processors, cause the one or more processors to perform operations comprising:

transmitting, by an identification processing device via capacitive communication that uses a body of an individual as a signal transmission waveguide, an identification sequence to a device associated with the individual;

receiving, by the identification processing device via the capacitive communication, confirmation that the individual possesses the device associated with the individual;

establishing, by the identification processing device via the capacitive communication, a communication connection with the device associated with the individual;

transmitting, by the identification processing device via the capacitive communication, a request to the device associated with the individual to transmit identification data stored on the device associated with the individual;

comparing, by the identification processing device, the identification data stored on the device associated with the individual with reference identification data associated with the individual;

determining, by the identification processing device based upon the comparing, that the identification data stored on the device associated with the individual matches the reference identification data; and authenticating, by the identification processing device based upon the determining, identification of the individual.

15. The computer-readable storage media of claim 14, wherein transmitting an identification sequence to a device associated with the individual comprises operations of:

transmitting a wake-up signal to the device associated with the individual;

detecting that the wake-up signal is meant for the device associated with the individual;

transitioning the device associated with the individual from a sleep state to an awake state; and transmitting, to the identification processing device via the capacitive communication, the confirmation that the individual possesses the device associated with the individual.

16. The computer-readable storage media of claim 14, wherein the device associated with the individual and the identification processing device communicate via the capacitive communication in both receiving and transmission modes.

17. The computer-readable storage media of claim 14, wherein the identification data stored on the device associated with the individual is pre-designated by the individual for authenticating and validating identity of the individual.

18. The computer-readable storage media of claim 17, wherein the identification data stored on the device associated with the individual comprises information associated with at least one of login information of the individual, telephone number(s), account number(s), date of birth, device identification/registration number(s) related to the device associated with the individual, associated contact information, passwords, access numbers, and fingerprint data.

19. The computer-readable storage media of claim 14, wherein the identification data stored on the device associated with the individual includes identification data saved by the individual for a particular software application for authenticating and validating identity of the individual.

20. The computer-readable storage media of claim 19, wherein transmitting an identification sequence to a device associated with the individual comprises: transmitting, by the identification processing device via the capacitive communication, instructions for the particular software application to transmit the identification data stored on the device associated with the individual to the identification processing device for the authenticating and validating identity of the individual.

* * * * *